Figure 1:
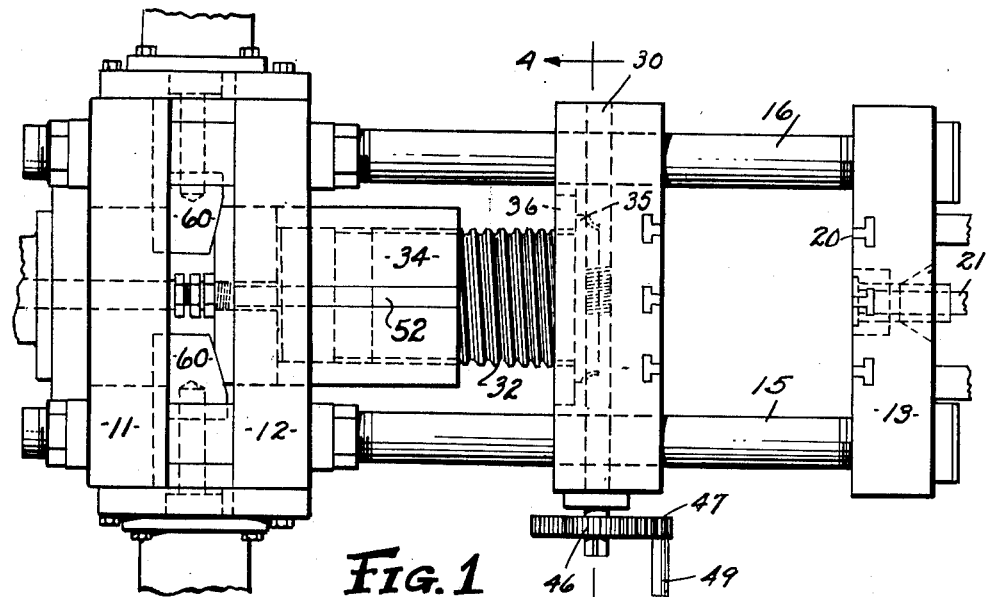

Nov. 25, 1952     J. A. PERKON     2,618,823
MOLDING MACHINE

Filed Sept. 28, 1949     2 SHEETS—SHEET 1

INVENTOR.
JOHN A. PERKON
BY
Bates, Teare, & McKean
Attorneys

Nov. 25, 1952  J. A. PERKON  2,618,823
MOLDING MACHINE
Filed Sept. 28, 1949   2 SHEETS—SHEET 2
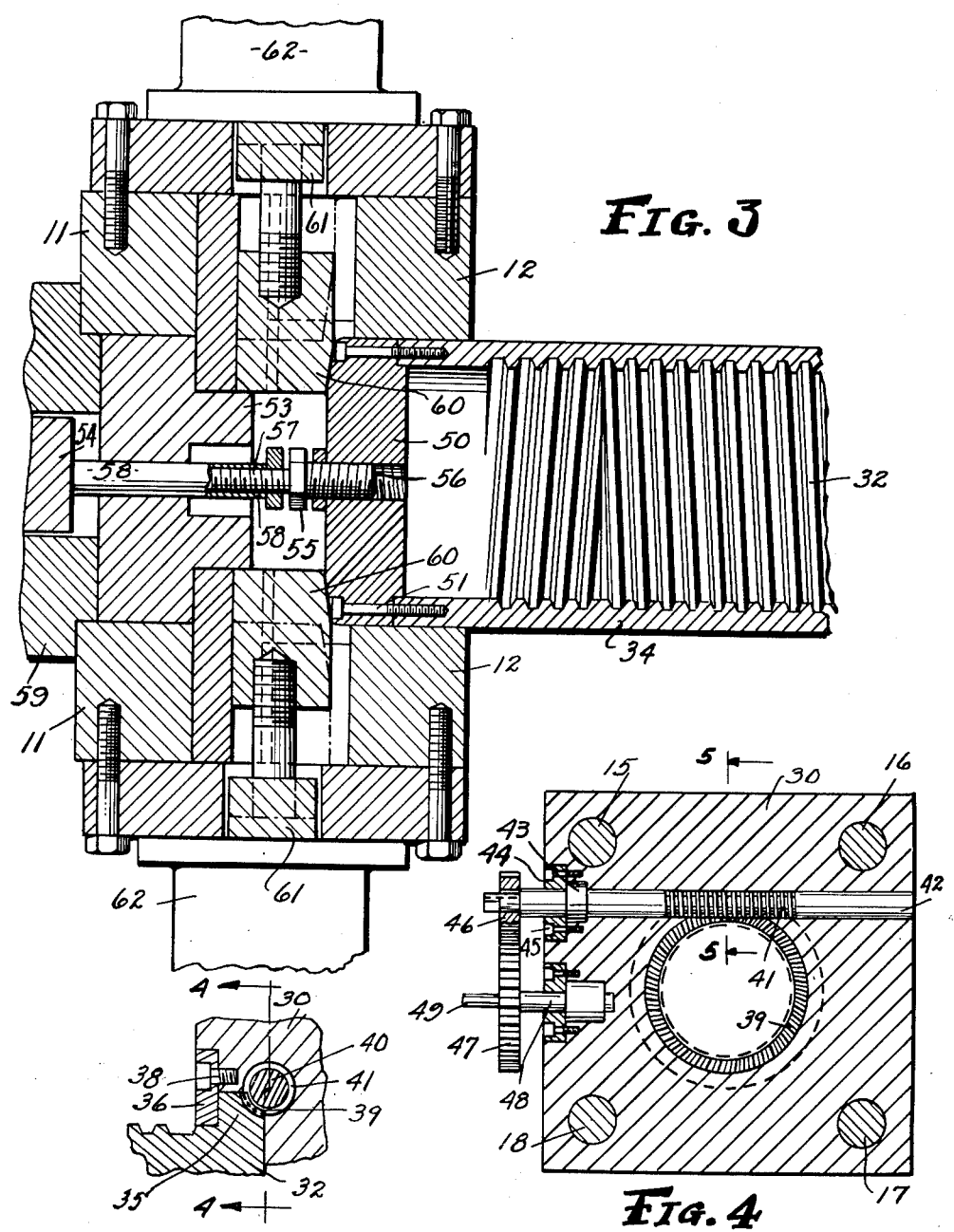

Patented Nov. 25, 1952

2,618,823

UNITED STATES PATENT OFFICE 2,618,823

MOLDING MACHINE

John A. Perkon, Cleveland, Ohio, assignor to Cuyahoga Industries, Cleveland, Ohio, a corporation of Ohio Application September 28, 1949, Serial No. 118,225

1 Claim. (Cl. 22—92)

This invention relates to a machine for positioning and firmly holding dies for making die castings or molded parts using opposing forming dies. The invention is particularly concerned with simple and efficient mechanism for moving the movable die toward its fixed mate and for holding such movable die very tightly and firmly in position to withstand the casting pressure.

My invention is illustrated in the drawings, in which conventional parts are omitted or merely indicated to clarify the presentation.

Figure 2:
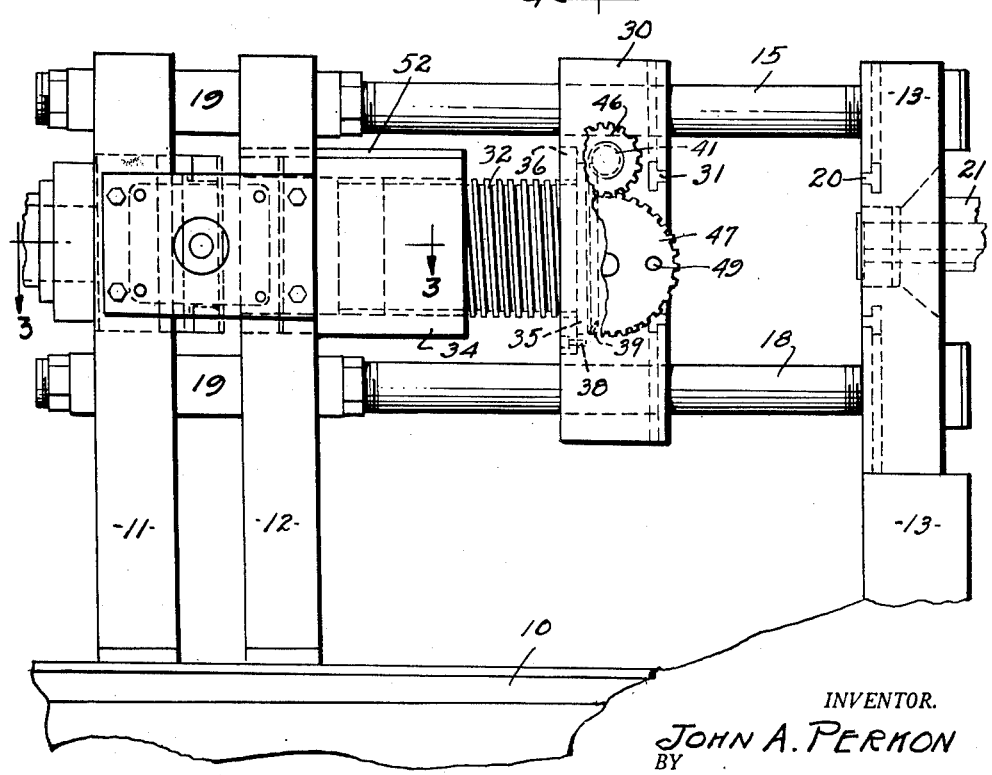

In the drawings, Fig. 1 is a plan of a complete machine embodying my invention; Fig. 2 is a front elevation of such machine; Fig. 3 is a fragmentary horizontal section on a larger scale in a plane indicated by the line 3—3 on Fig. 2; Fig. 4 is a transverse vertical section substantially of a plane indicated by the line 4—4 on Figs. 1 and 5; and Fig. 5 is a fragmentary longitudinal section in a plane indicated by the line 5—5 on Fig. 4.

In Figs. 1 and 2, I have indicated a suitable base 10 carrying three spaced upright frame members designated 11, 12 and 13. Four horizontal rods designated 15, 16, 17, 18, lying at the four corners of a theoretic transverse square, rigidly connect the three upright frame members. The rods are shown as being threaded in the respective members with distance pieces 19 between the frame members 11 and 12, suitable jamb nuts being employed where desired to establish an absolutely tight connection.

The upright and frame member 13 is provided with means indicated by the T-slots 20 for holding the fixed die (not shown), and with a suitable conduit indicated at 21 for the feeding of molten metal or other material under pressure through the fixed die to the molding cavity thereof. This frame member therefore constitutes an abutment for the fixed die.

Slidably mounted on the four horizontal rods is a movable cross head 30 which constitutes a movable abutment and carries the movable die (not shown), the fastening for the movable die being indicated by the T-slots 31 in the face of the cross head 30. The cross head carries rotatably an externally threaded screw 32 which is threaded into an internally threaded sleeve 34 held in non-rotative but longitudinally adjustable manner in the frame member 12. The rotation of the screw 32 accordingly will move the cross head with its movable die toward or from the opposed die and may thus bring the movable die into engagement with the fixed die.

The screw 32 has a rigidly attached head 35 which is mounted in a circular recess in the cross head 30 and is held therein by a clamping ring 36 which is seated in the cross head and held therein by suitable bolts, one of which is indicated at 38 in Fig. 2.

The head 35 on the screw 32 is formed at its peripheral edge with an annular concavity in which are cut worm threads as indicated at 39 in Fig. 4. Coacting with these threads are worm teeth 41 on a horizontal shaft 42 journalled in the cross head. The shaft is shown as having a collar 43 over which hands a ring 44 is set into a recess in the cross head and locked by bolts 45.

On the outer end of the worm shaft 42 I mount a pinion 46 with which meshes a driving gear 47 journalled on a pin 48 projecting from the cross head. The rotation of the driving gear therefor rotates the worm shaft which through the worm and worm wheel gearing rotates the screw 32 to move the cross head with its die. Any suitable means may be employed for rotating the driving gear. I have indicated a handle pin 49 for manual operation.

I have heretofore mentioned that the internally threaded sleeve 34 was held non-rotatably but slidably in the frame member 12. Referring particularly to Fig. 3, it will be seen that the sleeve 3, with a head 50 held thereon by suitable means, as for instance the screws 51, is mounted in a cylindrical opening in the member 12 and is prevented from rotation by a spline 52 occupying a keyway in the frame member 12. This sleeve is connected with a plunger 54 in a cylinder 59 which may receive fluid under pressure to force the sleeve and hence the screw 32, the cross head and the movable die into coaction with the fixed die.

The connection between the sleeve head 50 and the plunger 54 is adjustable. It is shown as a right-and-left hand screw 55, one member 56 of which is threaded in the head 50, while the other member as 57 is threaded in an internally threaded bushing 58 slidable in the block 53 mounted in the standard 11. The bushing 58 is firmly connected to the plunger 54. An intermediate head on the screw 55 allows it to be turned, as desired, to adjust the connection between the plunger 54 and the internally threaded sleeve.

As the casting operation produces a very considerable pressure within the cavity space of the dies, it is important to block the movable die against any possible shifting from the fixed die, even by a minute amount. I accomplish this by providing a pair of wedges 60 which are operated by plungers 61 in suitable cylinders 62 adapted to receive fluid under pressure. The outer face of the head 50 is inclined complementarily to the wedges to form a snug connection.

In the operation of my machine, the separated dies are secured respectively to the frame member 13 and the cross head 30. Then the driving gear or hand crank 35 is operated to rotate the screw 32 to bring the dies into coaction. Then fluid under pressure is admitted to the cylinder 55 to force the movable die snugly against the face of the fixed die and at the same time, or subsequently thereto, the fluid under pressure is admitted to the two cylinders 62 to force the wedges 60 into snug abutting engagement with the rear end of the sleeve head 50. This absolutely blocks the movable die against any possible movement from the fixed die and allows the insertion between the dies of material under a very heavy pressure.

By employing two wedge blocks 60 on opposite sides of the sleeve, I prevent any possible canting of the internally-threaded pressure actuated sleeve 34 resulting from the necessary clearance space between the sleeve and the frame member 12 in which it is closely but slidably mounted.

I claim:

In a molding machine having a frame, a stationary abutment carried thereby and adapted to carry a fixed die, a second stationary abutment carried by said frame and spaced from the first-named abutment, a third movable abutment mounted in the frame for linear reciprocation between the first two abutments and adapted to carry a cooperating die, an internally threaded cylinder slidably mounted in the second fixed abutment for movement to and from the first stationary abutment, means coacting between the cylinder and the second abutment for preventing rotation of the cylinder therein, an externally threaded screw having one end threadingly coacting with the internal thread of the cylinder, means connecting the other end of said screw against relative axial movement and for free rotation within the third movable abutment, mechanism carried by the movable abutment and drivingly coacting with the screw therein, externally accessible means carried by the movable abutment and operably coacting with said mechanism to rotate the screw and axially move the abutment relative to the cylinder, a power cylinder carried by said frame in axial alignment with the slidable cylinder, a piston in said power cylinder and having a piston rod extending towards said slidable cylinder, said second stationary abutment having a transverse guideway, longitudinally adjustable means connecting said piston rod to said slidable cylinder within the guideway, a wedge operably disposed in said guideway for movement transverse to the cylinder axis and adapted to engage the rear end of the slidable cylinder, and means for cyclically moving said wedge into and out of engagement with said slidable cylinder consequent upon the piston moving the slidable cylinder toward and away from the first stationary abutment respectively.

JOHN A. PERKON.

REFERENCES CITED

The following references are of record in the file of this patent:

UNITED STATES PATENTS

| Number | Name | Date |
| --- | --- | --- |
| 1,961,942 | Pack | June 5, 1934 |
| 2,112,342 | Lester | Mar. 29, 1938 |
| 2,115,590 | Ryder | Apr. 26, 1938 |
| 2,145,956 | Stern | Feb. 7, 1939 |
| 2,268,949 | Lehmann | Jan. 6, 1942 |
| 2,298,043 | Dinzl | Oct. 6, 1942 |
| 2,309,460 | Lester | Jan. 26, 1943 |